United States Patent [19]
Brett

[11] 3,834,537
[45] Sept. 10, 1974

[54] HIGH THROUGHPUT FILTER HAVING MULTIPOSITION VALVE

[75] Inventor: James E. Brett, Redondo Beach, Calif.

[73] Assignee: Purex Corporation, Ltd., Lakewood, Calif.

[22] Filed: June 29, 1973

[21] Appl. No.: 375,010

Related U.S. Application Data

[63] Continuation-in-part of Ser. No. 305,172, Nov. 9, 1972.

[52] U.S. Cl............. 210/136, 137/625.46, 210/169, 210/278
[51] Int. Cl............................................ B01d 23/24
[58] Field of Search ........... 210/136, 169, 278, 425, 210/427

[56] References Cited
UNITED STATES PATENTS
3,640,310   2/1972   Erlich .................................. 210/169
3,707,233   12/1972   Lerner ................................. 210/278

Primary Examiner—Roy Lake
Assistant Examiner—R. Daniel Crouse
Attorney, Agent, or Firm—White and Haefliger

[57] ABSTRACT

Filter for swimming pool water in which multiple operational modes including filtration, backwash and rinse modes are achieved with a valve structure affording positive sealing during operation, positive locking into mode, and adjustment between modes without frictionally wearing critical seals in the valve, and positive sealing at the waste discharge against air flow into the filter. The filter valve structure further employs large ports and direct flow passages to provide low pressure drop, even at very high flow rates through the filter, and a novel water distributor to avoid turbulence and undue disruption of the filter medium during filtration.

21 Claims, 12 Drawing Figures

PATENTED SEP 10 1974 3,834,537
SHEET 1 OF 5
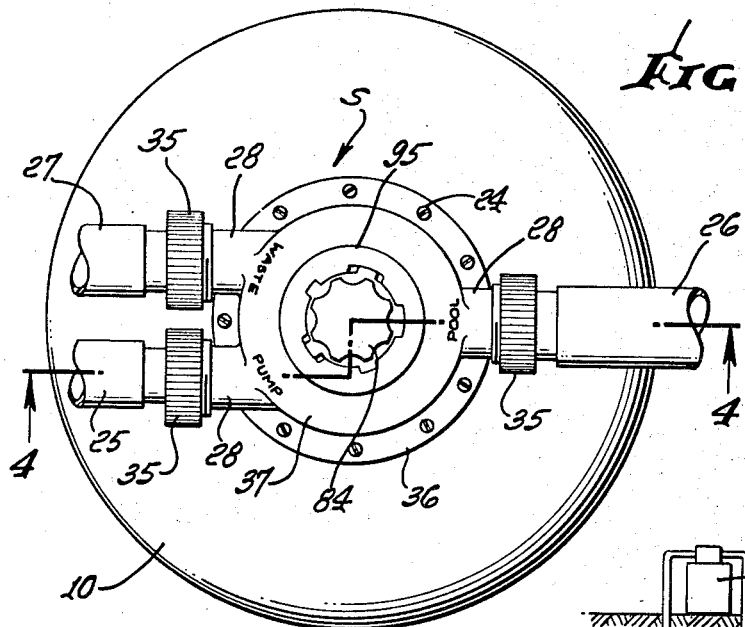
Fig.2.
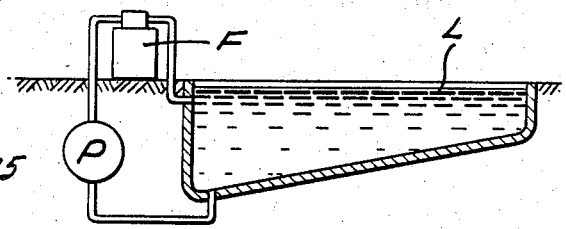
Fig.1.
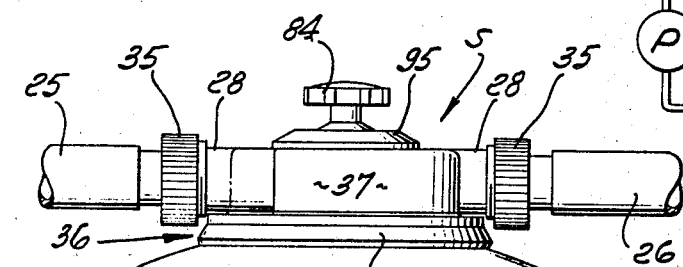
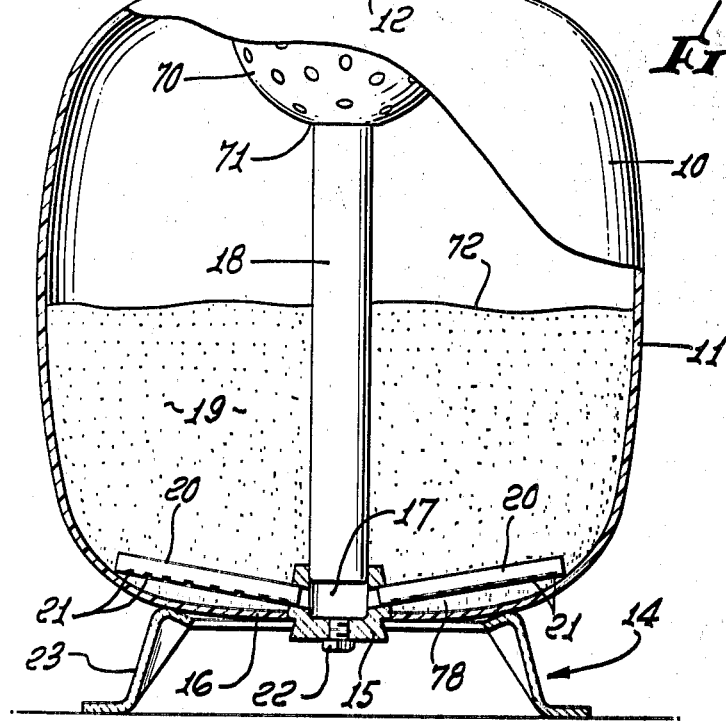
Fig.3.
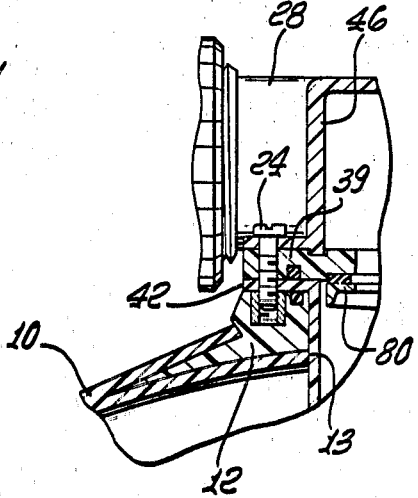
Fig.10.

FROM PUMP

TO POOL

FILTER MODE

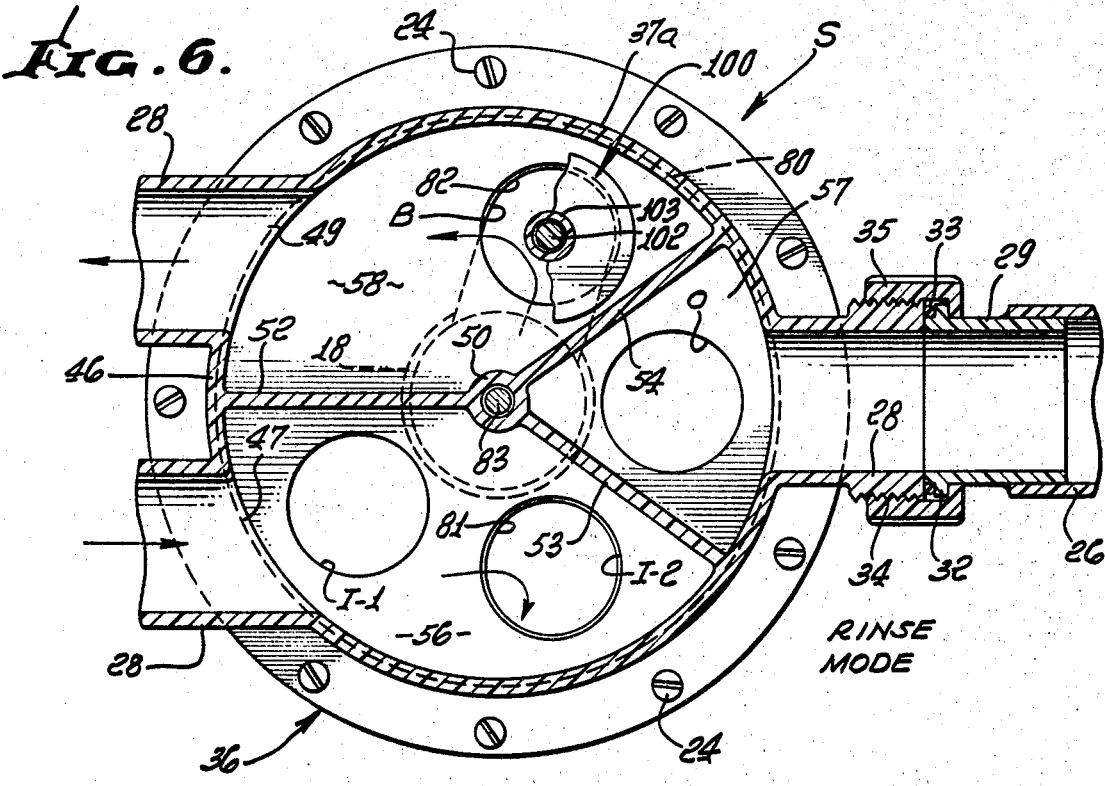

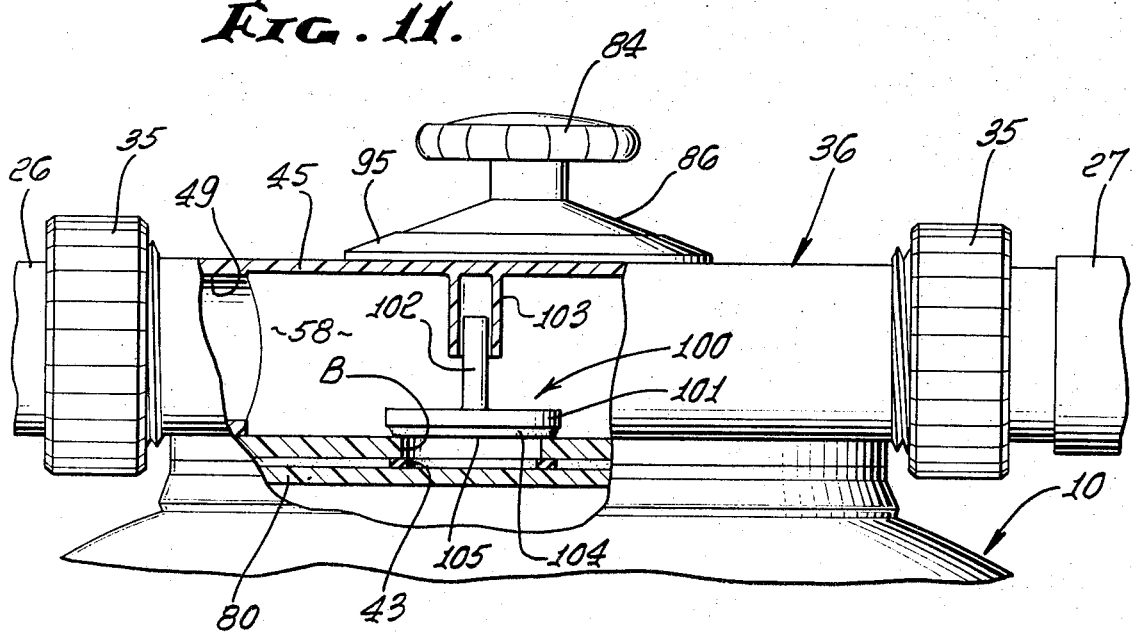
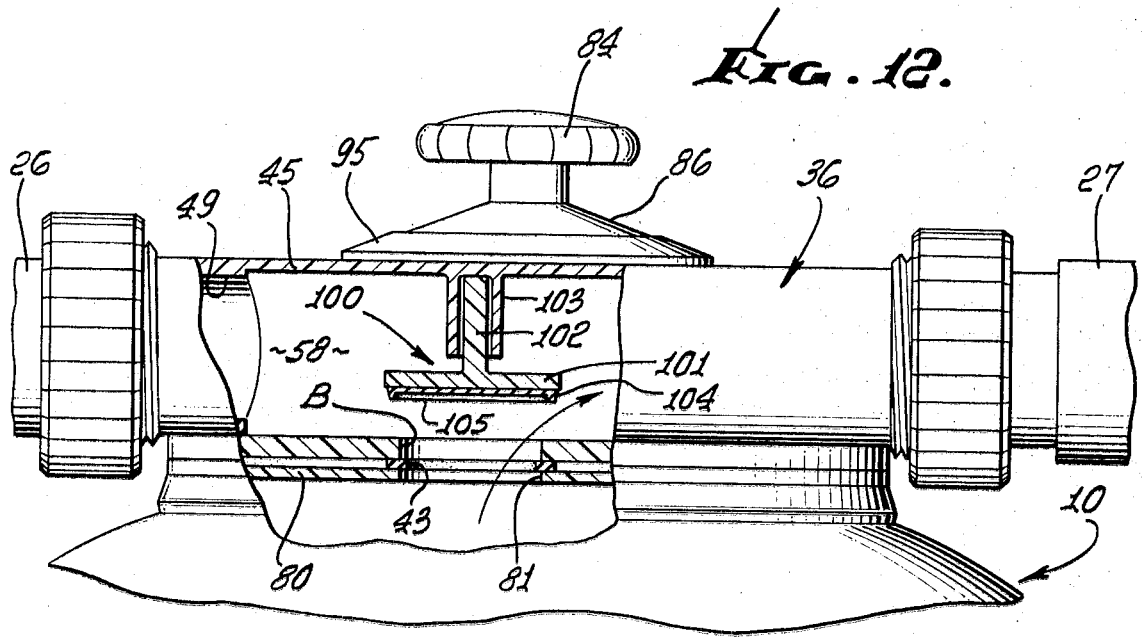

3,834,537

HIGH THROUGHPUT FILTER HAVING MULTIPOSITION VALVE

REFERENCE TO RELATED APPLICATION

This application is a continuation-in-part of my co-pending application Ser. No. 305,172, now U.S. Pat. No. 3,809,247, entitled HIGH THROUGHPUT FILTER HAVING MULTIPOSITION VALVE, filed Nov. 9, 1972, the subject matter of which is hereby incorporated by reference.

BACKGROUND OF THE INVENTION

The invention has to do with filter devices for filtration of swimming pool water, and more particularly with swimming pool water filters having a multi mode operational capability, and valve structure of improved design for achieving such capability with low maintenance requirements and high reliability over years of service.

PRIOR ART

Swimming pool filters of the packed bed type in which sand or like filtering medium is used, require periodic backwashing as the filter bed becomes clogged and pressure drops across the bed accordingly become excessive. Such filters are cleaned by reverse flushing with water, the debris being discharged to waste. Formerly the filter was then reconnected in the filtration mode but this often passes debris left in the backwash water in the filter into the pool. (See U.S. Pat. No. 3,451,544 to Wade). More recently a third mode of operation has been provided in such filters, termed a rinse mode; in this mode the water flows through the bed as in normal filtration, but the filtrate is passed to waste until clear, thereafter the filtrate is passed to the pool. See U.S. Pat. No. 3,640,310 to Erlich.

The valve structure by means of which operating modes are selected is the critical feature of such filters. Ideally the valve structure will be weel sealed, durable, easily operated, not unduly high in pressure drop and low in cost. The filtering water pressure should not work against the seals. See, however, U.S. Pat. No. 3,721,268 to Erlich et al.

SUMMARY OF THE INVENTION

The present valve structure and filter meet these criteria to a greater degree than previously available comparable devices. Thus, the present filter device includes valve structure which is positively biased into sealing engagement about the ports by filter vessel water pressure, so that the higher the vessel internal pressure, the greater the sealing force at the ports. The ports are relatively large and generally as large or larger than the incoming line diameter. The ports are immediately adjacent the incoming water to minimize unnecessary water circulation and accompanying pressure loss. Adjustment between the modes is effected with the seals out of sliding contact with the valve parts, avoiding a major source of wear and a significant cause of eventual filter device failure.

Additionally during filter shut down, relatively greater air pressure outside the filter than within, due to draining of the filter to the pool, is used to positively seal the waste discharge port against air ingress into the filter and possible loss of pump prime during downtime or during inter-modal adjustment.

In particular, the invention provides, a swimming pool filter comprising a vessel containing a water filtering medium and adapted for filtering water under pressure;

a valve structure for controlling reverse water flow through the filtering medium, the valve structure comprising a hollow body having axially alined upper and lower sections. The valve structure upper section comprises a housing containing a plurality of circularly spaced ports, typically lying in a common plane and defining respectively first and second inlet ports, an outlet port and a waste discharge port, and wall means defining an inlet ports chamber, an outlet port chamber and a waste discharge port chamber separately within the housing. The valve structure lower section contains wall structure surrounding the ports defining water distribution means to the upper portion of the filter medium, and means forming a separate water passage within the wall structure axially of the lower section and thence radially outward to the valve periphery to deliver water to and from the lower portion of the filter medium.

Port seals are provided below the ports carried on a rotatable valve plate having first and second circularly spaced valve openings arranged to selectively open and close the ports, the valve plate being shiftable axially normally into sealing engagement with the seal plate responsive to vessel water pressure on said plate and selectively out of such engagement for rotational adjustment against filter water pressure.

Valve operating means is provided including a handle above the valve body, the valve handle being operable to downwardly axially shift and angularly oscillate the valve plate among alternate positions and the port seals out of contact with the valve body seal plate. The alternate positions include: a first position for filtration in which fluid flows from the first inlet port to the vessel interior through the water distribution means to the filter medium and reversely therefrom through the water passage means to the outlet while the second inlet port and the waste discharge port and closed by the valve plate; a second position for filter medium backwash communicating the first inlet port with said water passage means and the vessel interior with the waste discharge port, and a third position for filter medium rinse following backwash communicating the second inlet port with the vessel interior and the water passage means with the waste discharge port. Additionally provided is a secondary valve means acting to block fluid flow through the waste discharge port into the vessel interior.

In particular embodiments: the water distribution means may comprise an axially elongated perforate shell extending coaxially of and within the filter vessel spaced above the upper portion of the filter medium; a pipe may be provided extending downwardly from the lower body section to the lower portion of the filter medium, and communicating with the water passage in the valve; the valve may have a circular chamber in open communication with the vessel interior and containing an essentially elbow configuration defining the water passage; the elbow configuration may depend from the valve plate and include a downwardly open tubular boss, the pipe extending upwardly from the lower portion of the filter medium for rotatably and slidably engaging the boss in fluid tight relation to define a continuation of the water passage; the water distribution means may comprise an axially elongated perforate shell coaxial with the pipe and having downward convergence to intersect the pipe in a plane below the boss.

There may additionally be provided, median shoulder means within the shell and an annular water diffusion plate centered on the pipe and supported by the shoulder means.

The secondary valve means typically comprises a poppet valve having a valve head carrying a resilient seal means, and sized to overlie the waste discharge port and a valve stem, and including also a socket tube depending from the upper housing wall means slidably receiving the valve stem in guiding relation.

The filter vessel will generally comprise wound glass fiber and resin impregnant and may include a valve structure mounting ring molded into the open top of said vessel, means to couple inlet, outlet, and waste discharge lines into respective housing chambers including for each chamber, an exteriorly threaded projecting stub, a tubular adapter appropriately sized at opposite ends to abut the stub and fluid tightly interfit an incoming line, an external annular rib at the inner end of the adapter, an O-ring seal between the sleeve and said rib, and an interiorly threaded adapter nut having an inward flange engaging said rib and thread connected to said stub in adjustable relation to compress the O-ring and couple an incoming line into a housing chamber.

In preferred embodiments, the lower section wall structure comprises a perforate shell having formed therein a multiplicity of individual orifices downwardly extending and variously radially directed outward toward the filter medium below to define the water distribution means, the means to couple inlet, outlet, and waste discharge lines into the housing at the inlet, outlet and waste discharge chambers respectively, includes vertically disposed openings through the upper section housing side wall and means to connect said lines thereto, said inlet, outlet, and waste discharge ports lying in a common horizontal plane adjacently below their respective openings and offset from the vessel axis, the coupling means, openings and ports being sized relative to these lines to define an unreduced water flow path cross-section from the lines to the water distribution means.

The valve operating means may typically include a valve operating rod extending between the valve handle and the valve plate; a locking ring surrounding the rod and locking means carried by the rod for engaging the ring in locked positions corresponding to filter operation modes and passing the locking ring when the valve handle is depressed; and a spring centered on the operating rod adapted to bias the rod locking means upward into locked engagement.

BRIEF DESCRIPTION OF THE DRAWINGS

The invention will be further described as to an illustrative embodiment thereof with reference to the attached drawings wherein:

FIG. 1 is a diagramatic view of a typical swimming pool installation wherein the present filter is used, indicating the valve as the relatively highest location in the system;

FIG. 2 is a top view of the filter vessel, valve structure and associated incoming and outgoing lines;

FIG. 3 is a side elevational view, partly in section of the filter and valve structures;

FIG. 6 is a view like FIG. 5, showing the rinse mode;

FIG. 7 is a view like FIG. 5 showing the backwash mode;

FIG. 10 is a fragmentary detail view, greatly enlarged of a portion of the valve structure assembly.

FIG. 11 is a view taken on line 11—11 in FIG. 5, partly broken away to show the secondary poppet valve of the invention in normally closed condition as during filtration, to block air entry to the filter through the waste discharge port.

FIG. 12 is a view like FIG. 11, taken on line 12—12 in FIG. 7, partly broken away to show the secondary poppet valve of the invention in opened condition to permit water flow out of the waste discharge port.

DESCRIPTION OF THE PREFERRED EMBODIMENTS

Figure 4:
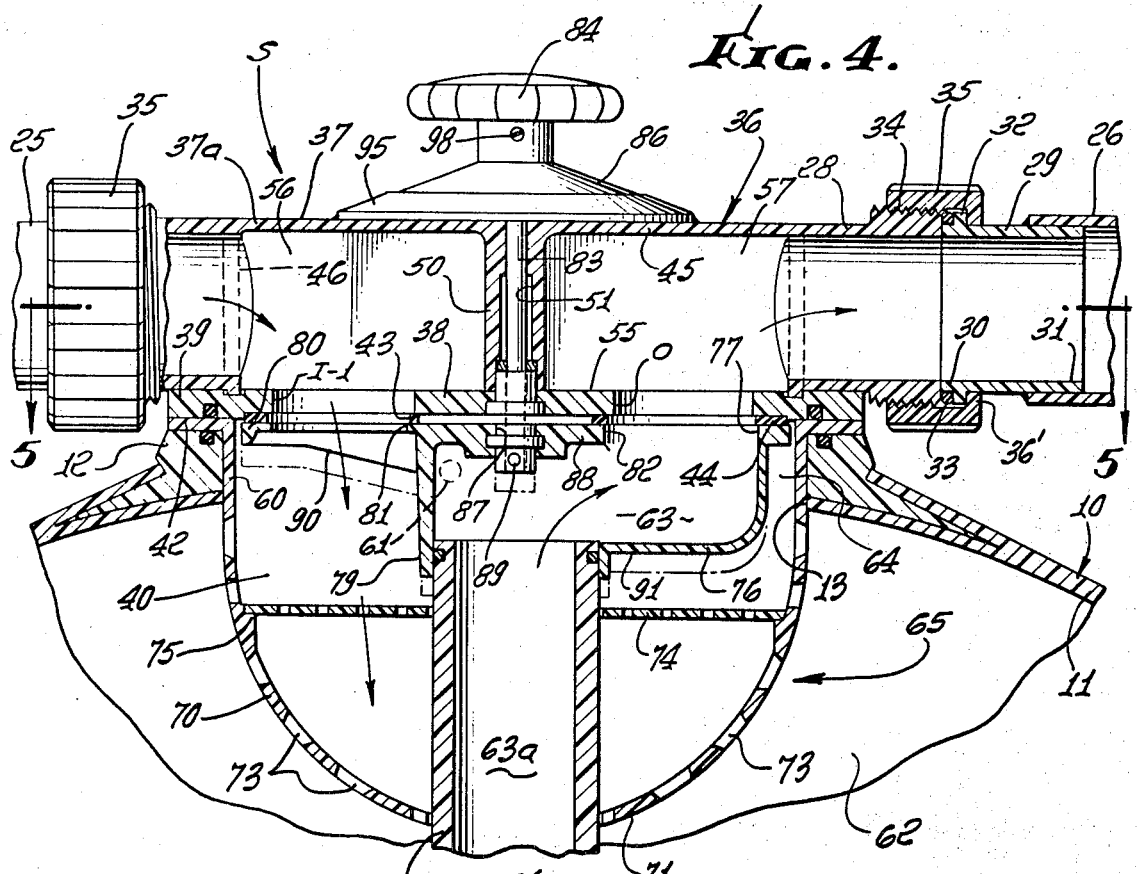
FIG. 4 is a view in vertical section taken on line 4—4 in FIG. 2.

With reference now to the drawings, in FIG. 1 a typical swimming pool installation is depicted in which pool water from pool L is circulated by pump P to and from the pool through filter F. Filter F according to the present invention, is shown in FIGS. 2 and 3 to comprise a filter vessel 10 which may be formed of sheet metal, or molded plastic or preferably of wound fiberglass walls 11 with a thermosetting resin impregnant, desirably with a valve structure mounting ring 12 embedded in the resin/filter system at the topmost opening 13 in the vessel, see FIG. 4. The filter F then comprises vessel 10 having mounting ring 12 atop thereof and a bottom or base 14 structure including a lower fitting 15 extending through the vessel bottom wall portion 16 embedded in the resin and fiber glass. The fitting 15 provides a manifold chamber 17 within the vessel into which the lower end of pipe 18 extending axially within the vessel through filter medium 19 is fitted and from which projects plural radially disposed collectors 20, being tubular members having downwardly directed openings 21 for collection of water. A threaded drain plug 22 is screwed into the filter 15 and pedestal 23 is secured to the fitting to support the vessel 10 above the ground.

The valve structure S is secured to the mounting ring 12 by a series of fasteners 24 as shown in FIGS. 2 and 10. With reference to FIG. 2, the valve structure S interconnects an incoming line 25 providing water under pressure from the pump P, and outlet line 26 which is the return line to the pool L and a waste discharge line 27 used to dispose of backwash and rinse water. Which pair of lines is interconnected is a function of the valve position selected.

Referring now to FIG. 4, incoming line 25 is shown at the left and outlet line 26, the return to pool L is shown at the right. The lines 25, 26, and 27 are connected to the valve structure S to be readily disconnected without the extensive plumbing work normally encountered in servicing filter devices. For this purpose, the valve structure S is provided with outwardly horizontally projecting exteriorly threaded stubs 28 of a large size e.g. 2 inches in diameter, approximating the largest size pipe to be encountered in normal installation. A tubular adapter 29 is provided sized at inner end 30 to abut the stub 28 and at outer end 31 to interfit with lines 25, 26, or 27, conveniently the tubular adapter 29 can be of two different diameters along its lengths, e.g., 1½ and 2 inches in diameter, and the smaller diameter portion cut off if not needed, as in the installation depicted in FIG. 4. Spaced from the adapter inner end 30, an annular rib 32 is provided to which O-ring seal 33 is abutted. An internally threaded adapter nut 35 having an inward flange 36 is butted against rub 32. The adapter 29 is now solvent welded to line 25, 26 or 27, and the adapter nut 35 threaded onto thread 34 bringing the adapter 29 up snug against the stub 28 and compressing O-ring 33 between the sleeve and rib 32, to effect a water tight but easily disconnected seal.

Again with reference to FIG. 4, and FIGS. 5-7, the valve structure comprises a hollow body 36 having alined upper section 37 with bottom wall 55 defining a seal plate and having a flange 39 and lower section 40 with outward flange 42, secured to the upper section by screws 24 (FIG. 10). The upper and lower sections are axially alined and coaxial with the vessel 10 longitudinal axis. The upper section 37 comprises a housing 37a containing four circularly spaced ports, namely inlet ports I-1 and I-2, rinse or backwash port B and outlet port O, all of which ports are formed in horizontal bottom wall 38 of the upper section and which accordingly lie in a common horizontal plane defined by said housing wall. Port seals 43 are carried on rotatable valve plate 80 to be provided about each port either individually or integrally with gasket 44. Housing 37a further includes an upper horizontal wall 45 and a cylindrical side wall 46 having vertically disposed openings 47, 48, and 49 respectively for incoming line 25, outlet line 26 and waste line 27. Centrally of the housing 37a a post 50 is provided having a stepped bore 51 for purposes to appear. Extending radially outward from the post 50 are interior walls 52, 53, 54 within the housing 37a which together with the top, side and bottom walls 45, 46, and 55 respectively, form three separate chambers within the housing namely an inlet ports chamber 56 communicating the incoming line 47 with inlet ports I-1 as shown (or I-2 as will be seen); outlet port chamber 57 communicating outlet opening 48 and outlet port O; and waste discharge port chamber 58 communicating waste discharge opening 49 and waste discharge port B.

The valve structure lower section 40 contains wall structure 60 surrounding the ports I-1, I-2, B and O and provided with vent opening 61 between interior 62 of vessel 10 and the water passage 63. The wall structure 60 defines an upper circular chamber 64 and further defines therebelow water distribution means, indicated at 65, of considerable advantage. Referring to FIG. 4, there is shown an axially elongated, downwardly convergent highly perforate shell 70 extending coaxially of and within the filter vessel 10 and lower valve section 40, the lower terminus 71 of said shell being spaced above the upper portion 72 of the filtering medium 19. (FIG. 3). Thus arranged, water from the inlet port I-1 passes through the shell perforations 73, the perforations being a multiplicity of individual orifices downwardly extending and variously radially directed outward toward the filter medium 19 below. The described perforate shell distributor 70 has been found to provide laminar currents within the water filling the vessel 10, and thereby reduce jet streams in the topmost portion 72 of the filtering medium e.g., sand and thus to prevent cratering, channeling and premature failure of the sand bed despite high throughput rates. Conventional single or multiple nozzle arrangements do not have laminar flow, or otherwise tend to make the top of a sand bed uneven, unlike the described arrangement. A transverse annular perforate diffusion plate 74 supported by internal shoulder 75 of the shell 70 can be provided opposite the inlet port I-1 and I-2 to break up incoming water streams, about the median level of the shell 70. Both plate 74 and shell 70 have aperturing exceeding inlet I-1 in cross sectional area.

The lower section 40 further contains means forming the separate water passage 63 within the wall structure 60 in the form of an essentially elbow configuration 76 extending axially of the lower section and thence radially outward to the valve periphery 77 to deliver water to and from the lower portion 78 of the filter medium 19. The elbow configuration 76 includes a downwardly open tubular boss 79 adapted to engage the pipe 18 extending upwardly from the lower portion of the filter medium, which thus defines a continuation 63a of the water passage 63.

The elbow configuration 76 is carried by and below the valve plate 80 with which it is preferably integrally formed. Valve plate 80 is a disc having first and second circularly spaced valve openings 81, 82 formed therein, in a common plane, parallel to the upper section port plane above described. The first and second valve openings 81, 82 are arranged to selectively open and close the ports I-1, I-2, O and B by rotation of the valve plates 80.

Figure 9:
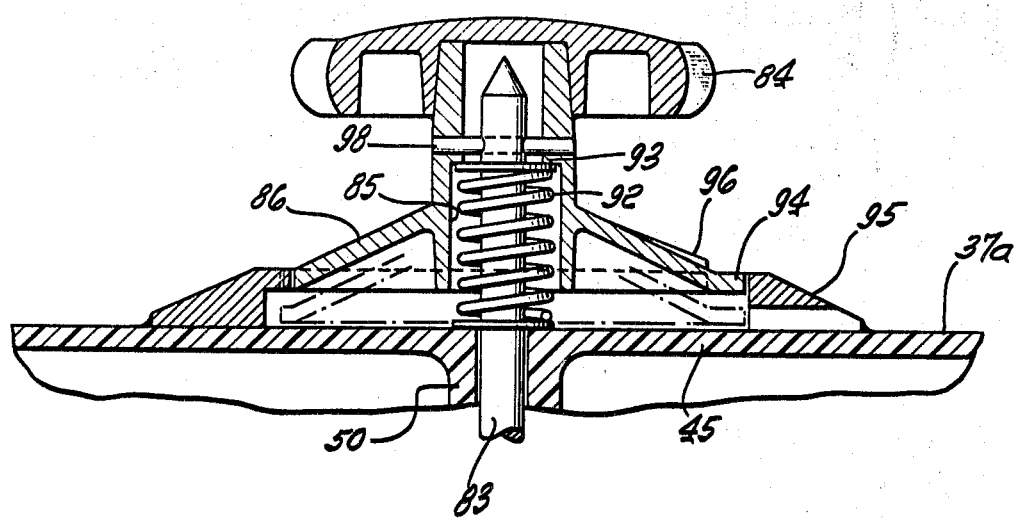
FIG. 9 is a view in vertical cross section of the handle and position locking means taken on line 9—9 in FIG. 8.

Referring to FIGS. 4 and 9, the valve plate 80 is carried on valve operating rod 83 which extends from valve handle 84 through bore 85 in locking member 86, post bore 51, aperture 87 in the valve plate 80 into fitting portion wall 88 of lower valve body section 40, secured by pin 89. The rod 83 is reciprocable and rotatable as thus mounted and thereby the valve plate 80 and water passage elbow configuration 76 are shiftable axially downward, (see the phantom lines), and rotatable into different operating positions, to be described. The engagement between the elbow configuration tubular boss 79 and pipe 18, noted above, is accordingly such as to permit both rotational and sliding movement to accommodate integral axial shifting and rotation of the lower section 40 and valve plate 80. Spacing of seals 43 on valve plate 80 from seal plate bottom wall 55 during adjustment between modes saves wear on these seals. The axial shiftability of the valve plate enables positive sealing force at the seals 43 during operation responsive to water pressure on surfaces 90, 91.

At this point a signal feature of the present valve device becomes apparent. The valve plate 80, it will be observed is on the underside, or pressure side, of the valve body 36, in constant pressure communication with the water which fills the vessel 10 during operation of the filter. The horizontal surface areas 90, 91 of the valve lower section 40 exerts an upward thrust which is not resisted by the reciprocable operating rod 83, but is borne by the port seals 43 engaging the seal plate bottom wall 55, whereby a positive seal is realized, the sealing of the valve plate 80 about the ports I-1, I-2, B, and O being responsive to internal water pressure in the vessel 10.

Figure 5:
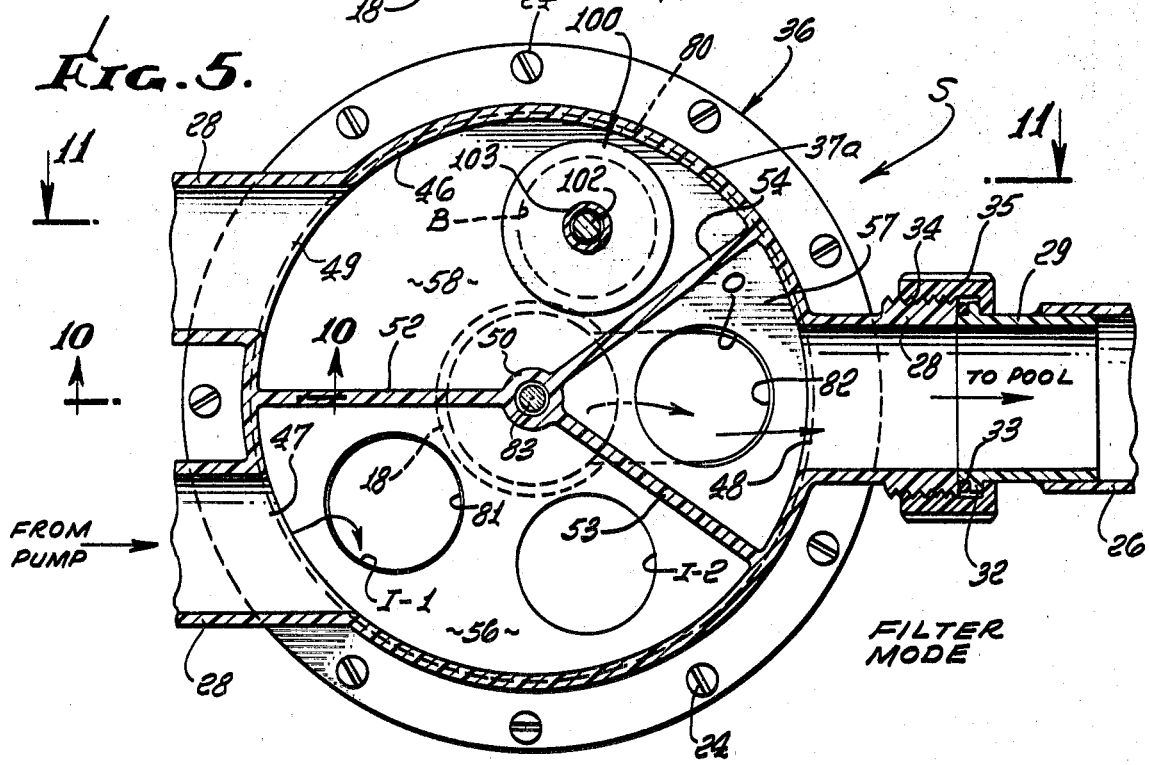
FIG. 5 is a horizontal cross sectional view of the valve upper section taken on line 5—5 in FIG. 4, and showing the filtration mode.
Figure 8:
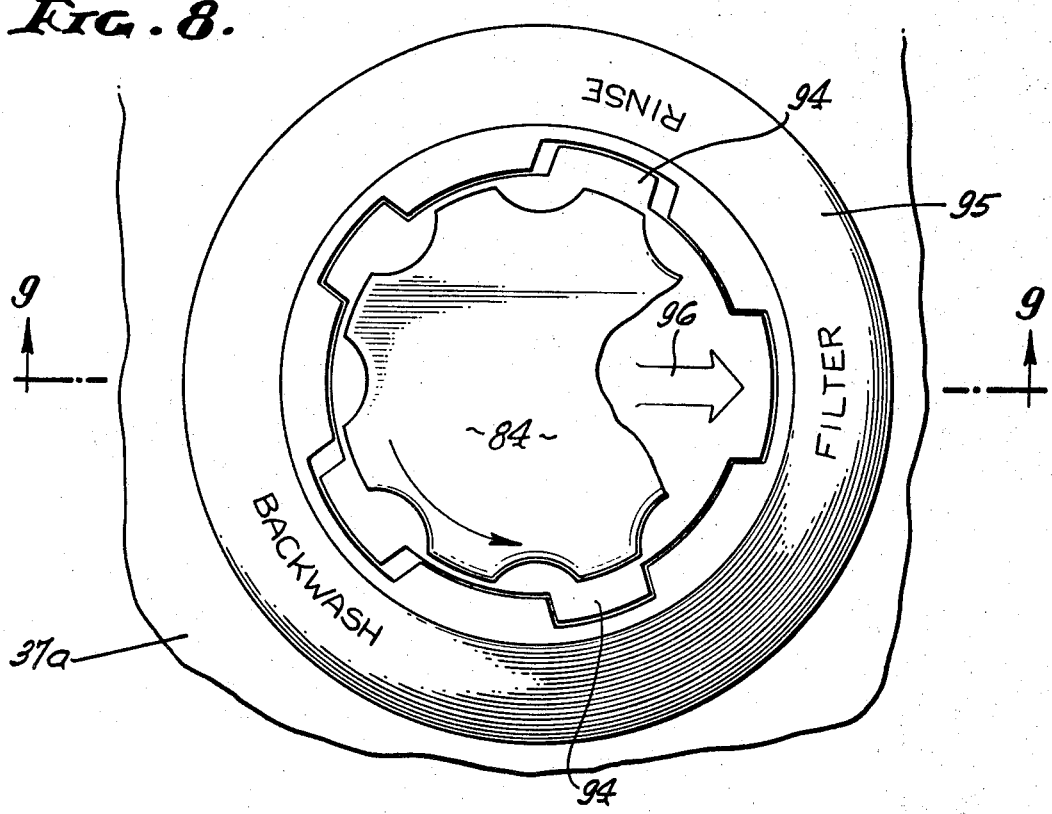
FIG. 8 is a plan view of the valve handle and position locking means.

In operation, the valve handle 84 is grasped and rod 83 secured by pin 98 depressed thereby against the force of spring 92 centered on the valve rod and captured between the top wall 45 of housing 37a and shoulder 93 within bore 85, and the force of water pressure within the vessel 10. The handle 84 is depressed far enough to have lugs 94 formed on the perimeter of locking member 86 carried below the valve handle, clear of the locking ring 95, to permit rotation. The valve handle 84 is rotated to a new position defined by the arrangement of lugs 94 and cooperating portions of the locking ring 95 whereupon depressing force is released and the locking member lugs brought coplanar with the locking ring. Assuming the filtering mode is first selected, the handle arrow 96 is turned toward "filter" and the inlet port I-1 is registered with the first valve plate opening 81, as shown in FIGS. 4, 5, and 8. Water from incoming line 25 enters inlet 56, is passed directly without substantial resitriction through port I-1 and valve first opening 81 and thence thorugh the diffusion plate 74 and distributor 70 onto and through the filter medium 19, whence the water is collected by collectors 20 and passed through manifold chamber 17 upward through pipe 18 through elbow configuration 76 and out valve second opening 82, outlet port O, outlet chamber 57, opening 48 and outlet line 26. This is the normal filter operation.

For backwash, the handle 84 is depressed, the arrow 96 is registered with "backwash" (FIG. 8) and the lower section 40 and valve plate 80 rotated to the position shown in FIG. 7. As will be evident, incoming pressurized water is directed down pipe 18 out through the collectors 20 and up through the filter medium 19 into the waste discharge chamber 58, dirt and debris being carried out with it. Prior to resuming the normal filtration position handle 84 is turned to register the arrow 96 (FIG. 8) with "rinse". This arrangement of ports is shown in FIG. 6. As there shown, incoming pressurized water is passed through inlet I-2 through the filter bed and returned up pipe 18, but thence out through waste discharge port B and waste discharge chamber 58, so that the pool is not contaminated with backwash water remaining in the filter media 19.

As may be noted from FIG. 1, the filter F is located above the pool L and accordingly there is a gravity-induced tendency of the water in the filter to drain back toward the pool, e.g., through a 5 to 7 foot height differential which may be encountered in a typical home pool installation. If the filter F is not fully airtight, as during hydraulically full operation, the valve plate 80 may become misalined or relax slightly, allowing seal 43 to move from the bottom wall 55, air may enter the filter and once in the piping system cause the pump to lose prime, to the pool owner's dismay and inconvenience. The same air inflow may occur in shifting between modes.

As pointed out above, a primary advantage of the present filter valve is the positive sealing force at the several ports during filter operation, by virtue of the water pressure on the valve plate 80. Excessive air pressure, however, when the water is not being circulated through the filter F by the pump P can cause some air leakage, at the waste discharge port B, because this port communicates with the atmosphere.

Accordingly, and as best shown in FIGS. 11 and 12, a secondary valve 100 is provided herein acting to block fluid i.e., air flow through the waste discharge port into the vessel interior. Valve 100 is a poppet valve having a circular valve head 101 sized to overlie the perimeter of waste discharge port B and a cylindrical valve stem 102 extending vertically upward centrally from the valve head in the waste discharge chamber 58. Extending downwardly from the housing upper wall 45 is socket tube 103, sized and arranged to overlie and slidably receive the valve stem 102 in guiding relation to define the axial travel path for the valve stem 102. The socket tube 103 acts to maintain the valve head centered over the waste discharge port B and free to move away from the port B in response to water flow through the port B to the waste discharge opening 49, by the stem sliding upward in the socket tube, (See FIG. 12) and to return to its seated, sealing relation at the discharge port B by descent from the socket tube when fluid pressure in waste discharge chamber 58 exceeds pressure within filter F, as from atmospheric air entering the chamber when the pump P is shut down and filter F thus does not contain pressurized water. See FIG. 11. Valve head 102 carries a resilient seal 104 of rubber or other elastomeric or like material having downward annular shoulder 105, to assist in sealing.

I claim:

1. A swimming pool water filter comprising a vessel containing a water filtering medium and adapted for filtering water under pressure;

a valve structure for controlling reverse water flow through the filtering medium, said valve structure comprising a hollow body having axially alined upper and lower sections;

the upper section comprising a housing containing a plurality of circularly spaced ports defining respectively first and second inlet ports, an outlet port and a waste discharge port, and wall means defining an inlets port chamber, an outlet port chamber and a waste discharge port chamber separately within the housing;

the lower section containing wall structure surrounding said ports defining water distribution means to the upper portion of the filter medium, and means forming a separate water passage within said wall structure axially of said lower section and thence radially outward to the valve periphery to deliver water to and from the lower portion of the filter medium;

port seals below said ports;

a rotatable valve plate having first and second circularly spaced valve openings arranged to selectively open and close said ports, said valve plate being shiftable axially normally into sealing engagement with said port seals responsive to vessel water pressure on said plate and selectively out of such engagement for rotational adjustment against said water pressure;

valve operating means including a handle above the valve body, said valve handle being operable to downwardly axially shift and angularly oscillate said valve plate out of contact with said port seals among alternate positions including a first position for filtration in which fluid flows from the first inlet port to the vessel interior through the water distribution means to the filter medium and reversely therefrom through the water passage means to said outlet while the second inlet port and the waste discharge port are closed by the valve plate, a second position for filter medium backwash communicating said first inlet port with said water passage means and the vessel interior with the waste discharge port, and a third position for filter medium rinse following backwash communicating the second inlet port with the vessel interior and the water passage means with the waste discharge port, and secondary valve means acting to block fluid flow through the waste discharge port into the vessel interior.

2. The filter according to claim 1 in which said water distribution means comprises an axially elongated perforate shell extending coaxially of and within the filter vessel spaced above the upper portion of the filter medium.

3. The filter according to claim 1 including also a pipe extending downwardly from said lower body section to the lower portion of the filter medium, and communicating with said water passage in the valve.

4. The filter according to claim 1, in which said valve has a circular chamber in open communication with the vessel interior and containing an essentially elbow configuration defining said water passage.

5. The filter according to claim 4, in which the elbow configuration depends from the valve plate and includes a downwardly open tubular boss, and including also a pipe extending upwardly from the lower portion of the filter medium for rotatably and slidably engaging said boss in fluid tight relation to define a continuation of said water passage.

6. The filter according to claim 5, in which said water distribution means comprises an axially elongated perforate shell coaxially with said pipe and having downward convergence to intersect said pipe in a plane below said boss.

7. The filter according to claim 6, including also median shoulder means within said shell and an annular water diffusion plate centered on said pipe and supported by said shoulder means.

8. The filter according to claim 7 in which said secondary valve means comprises a poppet valve having a valve head sized to overlie the waste discharge port and a valve stem, and including also a socket tube depending from the upper housing wall means slidably receiving the valve stem in guiding relation.

9. The filter according to claim 8 including also resilient seal means carried on the valve plate for sealing the waste discharge port.

10. The filter according to claim 1 in which said secondary valve means comprises a poppet valve having a valve head sized to overlie the waste discharge port and a valve stem, and including also a socket tube depending from the upper housing wall means slidably receiving the valve stem in guiding relation.

11. The filter according to claim 1, in which said ports lie in a common horizontal plane.

12. The filter according to claim 1, in which said vessel comprises wound glass fiber and resin impregnant and includes a valve structure mounting ring molded into the open top of said vessel.

13. The filter according to claim 1, including also means to couple inlet, outlet, and waste discharge lines into respective housing chambers including for each chamber, an exteriorly threaded projecting stub, a tubular adapter appropriately sized at opposite ends to abut the stub and fluid tightly interfit an incoming line, an external annular rib at the inner end of the adapter, an O-ring seal between the sleeve and said rib, and an interiorly threaded adapter nut having an inward flange engaging said rib and thread connected to said stub in adjustable relation to compress the O-ring and couple an incoming line into a housing chamber.

14. The filter according to claim 13, in which said lower section wall structure comprises a perforate shell having formed therein a multiplicity of individual orifices downwardly extending and variously radially directed outward toward the filter medium below to define said water distribution means.

15. The filter according to claim 1, including also means to couple inlet, outlet, and waste discharge lines into the housing at the inlet, outlet and waste discharge chambers respectively, said coupling means including vertically disposed openings through the upper section housing side wall and means to connect said lines thereinto, said inlet, outlet, and waste discharge ports lying in a common horizontal plane adjacently below their respective openings and offset from the vessel axis, said coupling means, openings and ports being sized relative to said lines to define an unreduced water flow path cross-section from said lines to said water distribution means.

16. The filter according to claim 15, in which said valve has a circular chamber in open communication with the vessel interior, and containing an essentially elbow configuration defining said water passage therewithin.

17. The filter according to claim 16, in which the elbow configuration depends from and moves with the valve plate, and includes a downwardly open tubular boss, and including also a pipe extending upwardly from the lower portion of the filter medium and rotatably and slidably engaging said boss in fluid tight relation to define a continuation of said water passages.

18. The filter according to claim 17, in which said water distribution means comprises an axially elongated perforate shell coaxial with said pipe and having downward convergence to intersect said pipe in a plane below said boss.

19. The filter according to claim 18, in which the valve operating means further includes a valve operating rod extending between the valve handle and the valve plate, a locking ring surrounding the rod and locking means carried by the rod for engaging the ring in locked positions corresponding to filter operation modes and passing the locking ring when the valve handle is depressed, and a spring centered on the operating rod adapted to bias the rod locking means upward into locked engagement.

20. The filter according to claim 19 in which said secondary valve means comprises a poppet valve having a valve head sized to overlie the waste discharge port and a valve stem, and including also a socket tube depending from the upper housing wall means slidably receiving the valve stem in guiding relation.

21. The filter according to claim 20 including also resilient seal means carried on the valve plate for sealing the waste discharge port.

* * * * *